(12) United States Patent
Matsuzaka

(10) Patent No.: US 7,929,797 B2
(45) Date of Patent: Apr. 19, 2011

(54) DETERMINING IF AN IMAGE IS BLURRED

(75) Inventor: Kenji Matsuzaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 990 days.

(21) Appl. No.: 11/809,609

(22) Filed: Jun. 1, 2007

(65) Prior Publication Data

US 2007/0279696 A1    Dec. 6, 2007

(30) Foreign Application Priority Data

Jun. 2, 2006    (JP) ................................. 2006-154965

(51) Int. Cl.
*G06K 9/40* (2006.01)
*G06K 15/00* (2006.01)

(52) U.S. Cl. ....................... 382/274; 358/3.26; 358/3.21

(58) Field of Classification Search .................. 382/274, 382/254, 255, 282, 262; 358/3.26, 3.21, 358/1.15; 348/345, 333.05, 208.4
See application file for complete search history.

(56) References Cited

U.S. PATENT DOCUMENTS

| | | | |
|---|---|---|---|
| 6,771,308 B1 * | 8/2004 | Yamamoto et al. | 348/207.2 |
| 6,900,841 B1 * | 5/2005 | Mihara | 348/345 |
| 7,548,238 B2 * | 6/2009 | Berteig et al. | 345/426 |
| 2003/0151688 A1 * | 8/2003 | Tojo | 348/345 |
| 2004/0239983 A1 * | 12/2004 | Shiota | 358/1.15 |
| 2007/0071346 A1 * | 3/2007 | Li et al. | 382/254 |

FOREIGN PATENT DOCUMENTS

| | | |
|---|---|---|
| JP | 04-170872 | 6/1992 |
| JP | 04-373372 | 12/1992 |
| JP | 10-340332 | 12/1998 |

OTHER PUBLICATIONS

Abstract of Japanese Patent Publication No. 04-170872, Pub. Date: Jun. 18, 1992, Patent Abstracts of Japan.
Abstract of Japanese Patent Publication No. 04-373372, Pub. Date: Dec. 25, 1992, Patent Abstracts of Japan.
Abstract of Japanese Patent Publication No. 10-340332, Pub. Date: Dec. 22, 1998, Patent Abstracts of Japan.

* cited by examiner

*Primary Examiner* — Yon Couso
(74) *Attorney, Agent, or Firm* — Martine Penilla & Gencarella, LLP

(57) ABSTRACT

A technology for making determinations as to whether the image of an image data file is blurred, with low processing load, is provided. First, photographic image data PID containing pixel color information, as well as thumbnail image data for the photographic image data, are prepared. A specific pixel is then selected from among the pixels of the thumbnail image data. Specifically, on the basis of data of a pixel under examination and data of a pixel neighboring the pixel under examination, it is determined whether the pixel under examination should be designated as the specific pixel. Then, for a specific region Ape which is a region constituting part of the photographic image data PID and which corresponds to the specific pixel of the thumbnail image data, analysis of the photographic image PID is carried out, and a localized blur level that represents indistinctness of the image in the specific region Ape is calculated. Subsequently, in the event that the localized blur level of the specific region Ape contained in the photographic image data PID meets a prescribed condition, it is determined that the image of the photographic image data PID is blurred.

11 Claims, 10 Drawing Sheets

| POSITION | 0 | 1 | 2 | 3 | 4 | 5 | 6 | 7 |
|---|---|---|---|---|---|---|---|---|
| LUMINANCE LEVEL $L1_i$ | 1 | 0 | 0 | 0 | 0 | 0 | 0 | 0 |
| ONE-DIMENSIONAL DCT COEFFICIENT $Cf1_i$ | -361.685 | 0.46194 | 0.490393 | 0.415735 | 0.353553 | 0.277785 | 0.191342 | 0.097545 |
| NORMALIZED DCT COEFFICIENT $Cfn1_i$ | — | 0.214305 | 0.201871 | 0.181679 | 0.154505 | 0.121394 | 0.083618 | 0.042628 |

Fig.12

| LUMINANCE CHANGE PATTERN | SIGN OF F01 (F10) | SIGN OF F01 (F10) AND SIGN OF F02 (F20) |
|---|---|---|
| P01a | + | = |
| P01b | − | ≠ |
| P01c | − | = |
| P01d | + | ≠ |

DETERMINING IF AN IMAGE IS BLURRED

BACKGROUND

1. Technical Field

The present invention relates to technology for determining the extent of blur in the image of an image data file.

2. Related Art

Technologies employing a process such as the following to determine whether an image is blurred have been known to date. Specifically, the differences in brightness fx, fy between a target pixel in an image and pixels neighboring the target pixel in the X direction and the Y direction are determined, and the square root g (x, y) of the sum of squares is calculated. The average value of g (x, y) for all pixels in the image is then calculated by way of a "sharpness level SL." On the basis of the magnitude of SL, a decision is made as to whether the image is blurred.

However, since the above technology requires that calculations be performed for each pixel in the image data, necessitating an enormous volume of processing.

With a view to addressing the above issue, an advantage of some aspects of the present invention is that it can be determined, with a low processing load, whether an image of an image data file is blurred.

The entire disclosure of Japanese patent application No. 2006-154965 of SEIKO EPSON is hereby incorporated by reference into this document.

SUMMARY

In order to attain the above objective, the invention in a first aspect thereof provides a printing device for selecting a set of photographic image data for printing from among multiple sets of photographic image data, having a configuration like the following. The printing device includes a data acquiring module, a thumbnail image analyzing module, a photographic image analyzing module, and a printing module.

The data acquiring module receives photographic image data that contains pixel color information, and thumbnail image data of the photographic image data. The thumbnail image data contains pixel color information. The thumbnail image analyzing module selects one or more specific pixels from among pixels of the thumbnail image data. The photographic image analyzing module performs analysis of the photographic image data for a specific region thereof constituting a part of an image of the photographic image data corresponding to the specific pixels of the thumbnail image data. The photographic image analyzing module then calculates a localized blur level which represents indistinctness of image in the specific region. The printing module carries out printing based on the photographic image data, in the event that the localized blur level of the specific region contained in the photographic image data meets a prescribed condition. The prescribed condition can be a condition indicating that the image of the photographic image data is not blurred. Analysis of photographic image data for the specific region refers to analysis of a portion of the photographic image data corresponding to the specific region.

According to this aspect, when selecting a set of photographic image data for printing from among several sets of photographic image data, the determination as to whether an entire image is blurred can be made by carrying out processing for a specific region in the image of the photographic image data, and those images determined to be distinct can be selected and printed. Thus, the determination as to whether an image of an image data file is blurred can be made with a lower processing load, in comparison to the case where processing is carried out for all of the pixels of an entire image.

The thumbnail image analyzing module may preferably determine whether a pixel under examination is one of the specific pixels, on the basis of data for the pixel under examination and data for a pixel neighboring the pixel under examination.

In a photographic image, the issue of whether boundaries between different colors are distinct will have a significant effect on the decision by the user as to whether the overall image is blurred. According to the aspect described above, a specific pixel in a thumbnail image corresponding to a block region situated at the boundary of regions of different color in an image of photographic image data is designated as the specific pixel. Specifically, according to the aspect hereinabove, processing is performed for a region having a high probability of containing a color boundary, since such a region in an image has appreciable impact on the determination as to whether the image is blurred overall. Consequently, the determination as to whether an image is blurred can be made efficiently. A first pixel and second pixel that are "neighboring" refers to the fact that no other pixel is present between the first pixel and the second pixel.

It is preferable that the photographic image analyzing module determines the localized blur level on the basis of data for a plurality of pixels contained in the specific region. The plurality of pixels are lined up in a direction towards a position of the neighboring pixel with respect to the pixel under examination in an image of the thumbnail image data.

According to this aspect, the localized blur level can be determined through analysis of data of a specific region, along a direction intersecting a direction in which a color boundary is thought to lie within an image. This affords high probability of being able to accurately evaluate the localized blur level of a color boundary.

In preferred practice, the thumbnail image analyzing module will select a first specific pixel and a second specific pixel from among the pixels of the thumbnail image data, through a process such as the following. The thumbnail image analyzing module selects one or more first specific pixels from among pixels of the thumbnail image data by determining whether the pixel under examination is one of the first specific pixels, on the basis of the data for the pixel under examination and data for a first pixel neighboring a first side of the pixel under examination. The thumbnail image analyzing module also selects one or more second specific pixels from among the pixels of the thumbnail image data by determining whether the pixel under examination is one of the second specific pixels, on the basis of the data for the pixel under examination and data for a second pixel neighboring a second side of the pixel under examination. The direction in which the pixel under examination and the second pixel line up forms a 90 degree angle with respect to a direction in which the pixel under examination and the first pixel line up.

The photographic image analyzing module may preferably determine a first localized blur level for a first specific region corresponding to the first specific pixels, on the basis of data for a plurality of pixels lining up in the direction in which the first pixel lies with respect to the pixel under examination. The photographic image analyzing module may also preferably determine a second localized blur level for a second specific region corresponding to the second specific pixel, on the basis of data for a plurality of pixels lining up in the direction in which the second pixel lies with respect to the pixel under examination.

The printing module may preferably perform printing on the basis of the photographic image data, in the event that the first and second localized blur levels of the first and second specific regions meet a prescribed condition. Specifically, in a further aspect, determinations as to whether an image of photographic image data is blurred can be made on the basis of first and second localized blur levels of the first and second specific regions. According to this aspect, localized blur level can be determined through image analysis performed in two directions at a 90 degree angle to one another. Consequently, distinct images can be selected for printing on the basis of a criterion similar to the extent of blurring that would be perceived in the image by a user.

Where the photographic image data is data containing a plurality of frequency component coefficients, yet another preferred aspect is as follows. The photographic image analyzing module selects one basic pattern from among a plurality of basic patterns represented respectively by the plurality of frequency component coefficients, on the basis of a plurality of frequency component coefficients representing change in level of brightness of the specific region for a direction in which the neighboring pixel lies with respect to the specific pixel in an image of the thumbnail image data. The basic patterns are associated with mutually different ranges of blur. The photographic image analyzing module then determines the localized blur level of the specific region, on the basis of a range of blur associated with the selected basic pattern.

In accordance with this aspect, the localized blur level of a specific region can be determined without conversion of photographic image data that contains a plurality of frequency component coefficients into image data having color data for each pixel. That is, the localized blur level of the specific region can be determined with a lower processing load.

Where the thumbnail image analyzing module selects the first and second specific pixels from among the pixels of the thumbnail image data, yet another preferred aspect is as follows. The photographic image analyzing module may select one first basic pattern for a first specific region corresponding to the first specific pixel, on the basis of the coefficient representing change in level of brightness for the direction in which the first pixel lies with respect to the pixel under examination. The photographic image analyzing module may also determine a first localized blur level of the first specific region on the basis of a range of blur associated with the first basic pattern. The photographic image analyzing module may select one second basic pattern for a second specific region corresponding to the second specific pixel, on the basis of the coefficient representing change in level of brightness for the direction in which the second pixel lies with respect to the pixel under examination. The photographic image analyzing module may also preferably determine a second localized blur level of the second specific region, on the basis of a range of blur associated with the second basic pattern.

The printing module may preferably perform printing on the basis of the photographic image data, in the event that the first and second localized blur levels of the first and second specific regions meet a prescribed condition. Specifically, in a still further aspect, determinations as to whether an image of photographic image data is blurred can be made on the basis of first and second localized blur levels in the first and second specific regions. According to this aspect, localized blur level can be determined through image analysis performed in two directions at a 90 degree angle to one another.

It is preferable that the thumbnail image analyzing module designates the pixel under examination as one of the specific pixel, in the event that a difference between a level of brightness of data of the pixel under examination and a level of brightness of data of the neighboring pixel exceeds a first threshold. More specifically, the level of brightness can be expressed as luminance. The level of brightness can also be a tone value indicating the intensity of red, green, or blue.

The first threshold may be determined depending on an average value of levels of brightness of pixels of the thumbnail image data. According to this aspect, image processing relating to blur level can be carried out in a manner reflecting the human visual faculty, which perceives distinctness differently depending on the absolute level of brightness, even if the differences of levels of brightness in the neighboring regions are same degree.

The thumbnail image analyzing module may preferably determine a facial region in which a human face appears within the image of the thumbnail image data, and select the specific pixel from among pixels contained in the facial region.

Whether or not a human face appearing in a photographic image is distinct is a factor having an appreciable effect on the determination by the user as to whether the overall image is blurred. According to the aspect described above, a specific pixel can be selected from among pixels in a thumbnail image which correspond to a region representing a human face in an image of photographic image data. Consequently, according to this aspect, the determination as to whether an image is blurred can be made while limiting the target for processing to a region of particular importance.

The thumbnail image analyzing module may preferably include a camera shake data generating module. The camera shake data generating module generates first camera shake data representing whether the photographic image data is a camera shake image, on the basis of a first disparity between the data of the pixel under examination and data of a first pixel neighboring a first side of the pixel under examination, as well as a second disparity between the data of the pixel under examination and data of a second pixel neighboring a second side of the pixel under examination. The camera shake data generating module generates second camera shake data representing a direction of camera shake, in the event that the photographic image data is a camera shake image.

A "camera shake image" refers to an image in which the picture contours are particularly indistinct in a specific direction. In contrast, in an image that is out of focus at the time of shooting, the picture contours will be indistinct substantially uniformly in all directions. The "disparity of pixel data" herein can be differences in pixel luminance.

The thumbnail image analyzing module may determine a facial region in which a human face appears within the image of the photographic image data, and select on one more pixels in the facial region as the specific pixels.

Whether or not a human face in a photographic image is distinct is a factor having an appreciable effect on the determination by the user as to whether the overall image is blurred. According to the aspect described above, a specific pixel can be selected from among pixels in a thumbnail image which correspond to a region representing a human face in an image of photographic image data. Specifically, according to this aspect, processing is carried out on a region of the image with significant effect on the determination as to whether the overall image is blurred. Consequently, determinations of blurriness can be made efficiently.

It is possible for the present invention to be reduced to practice in various modes, for example, a printing method and a printing device; a printing control method and a printing control device; a method for determining whether there is blur in an image of photographic image data, and a device for implementing the method; a computer program for implementing the functions of such a method or device; a recording medium having such a computer program recorded thereon; a data signal containing such a computer program and taking the form of a carrier wave; and so on.

These and other objects, features, aspects, and advantages of the present invention will become more apparent from the following detailed description of the preferred embodiments with the accompanying drawings.

BRIEF DESCRIPTION OF THE DRAWINGS

FIG. 12 is a table depicting relationships between direction of pattern luminance change and sign of the DCT coefficients.

DESCRIPTION OF EXEMPLARY EMBODIMENT

A. Embodiment 1

Figure 1:
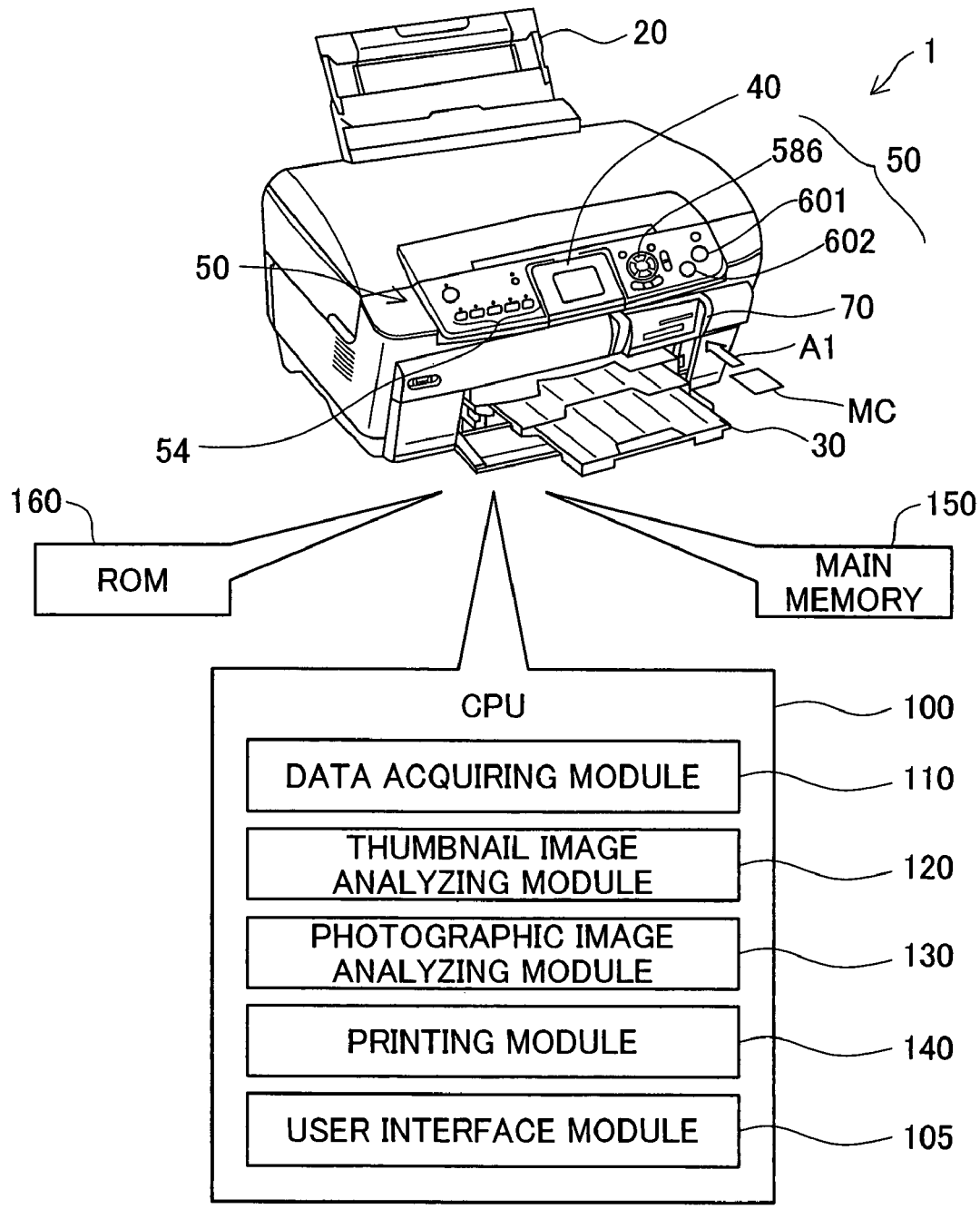
FIG. 1 is a perspective view of a printer 1 embodying the present invention.

FIG. 1 is a perspective view of the present invention in the embodiment of a printer 1. The printer 1 is able to carry out printing independently on the basis of an image data file stored on a recording medium, without the printer being connected to an external computer. This printer 1 includes a print head (not shown) that prints by ejecting ink drops; an auto sheet feed 20 for feeding the printing paper; a paper discharge tray 30 for receiving printing paper on which images have been imprinted; a liquid crystal display 40; a button group 50 for performing various operations; a card slot 70 for reading data from an inserted memory card; a CPU 100; a main memory 150; and a ROM 160. In FIG. 1, the CPU 100, the main memory 150, the ROM 160 are depicted to the outside of the printer as a aid to description.

A memory card MC such as a Compact Flash™ card, SD card, miniSD card, memory stick, smart media card, or the like can be inserted into the card slot 70 directly, or via an adaptor (see arrow A1 in FIG. 1). Via the card slot 70 the CPU 100 can then acquire a number of image data files stored on the memory card MC.

The liquid crystal display 40 which is of 2.5" size is located at the center of the control panel of the printer 1. The liquid crystal display 40 can display color images. The liquid crystal display 40 can display an image of an image data file stored on the memory card MC, for example. The liquid crystal display 40 can also display information indicating the status of the printer 1, as well as control menus for use by the user when inputting commands to the printer 1 via the button group 50.

The functional module of the CPU 100 which displays user interface screens on the liquid crystal display 40 and prompts input by the user, as well as handing commands input by the user via the button group 50, is denoted in FIG. 1 as the user interface module 105.

A mode button group 54 is provided to the left side of the liquid crystal display 40. The mode button group 54 has several buttons allowing the user to switch the operating mode of the printer. One button corresponds to one operating mode.

To the right side of the liquid crystal display 40 are provided a selection button group 586 composed of four buttons at left, right, top and bottom, for selection from of a number of icons or menus displayed on the liquid crystal display 40; a color print button 601 for initiating color printing; and a monochrome print button 602 for initiating monochrome printing.

Figure 2:
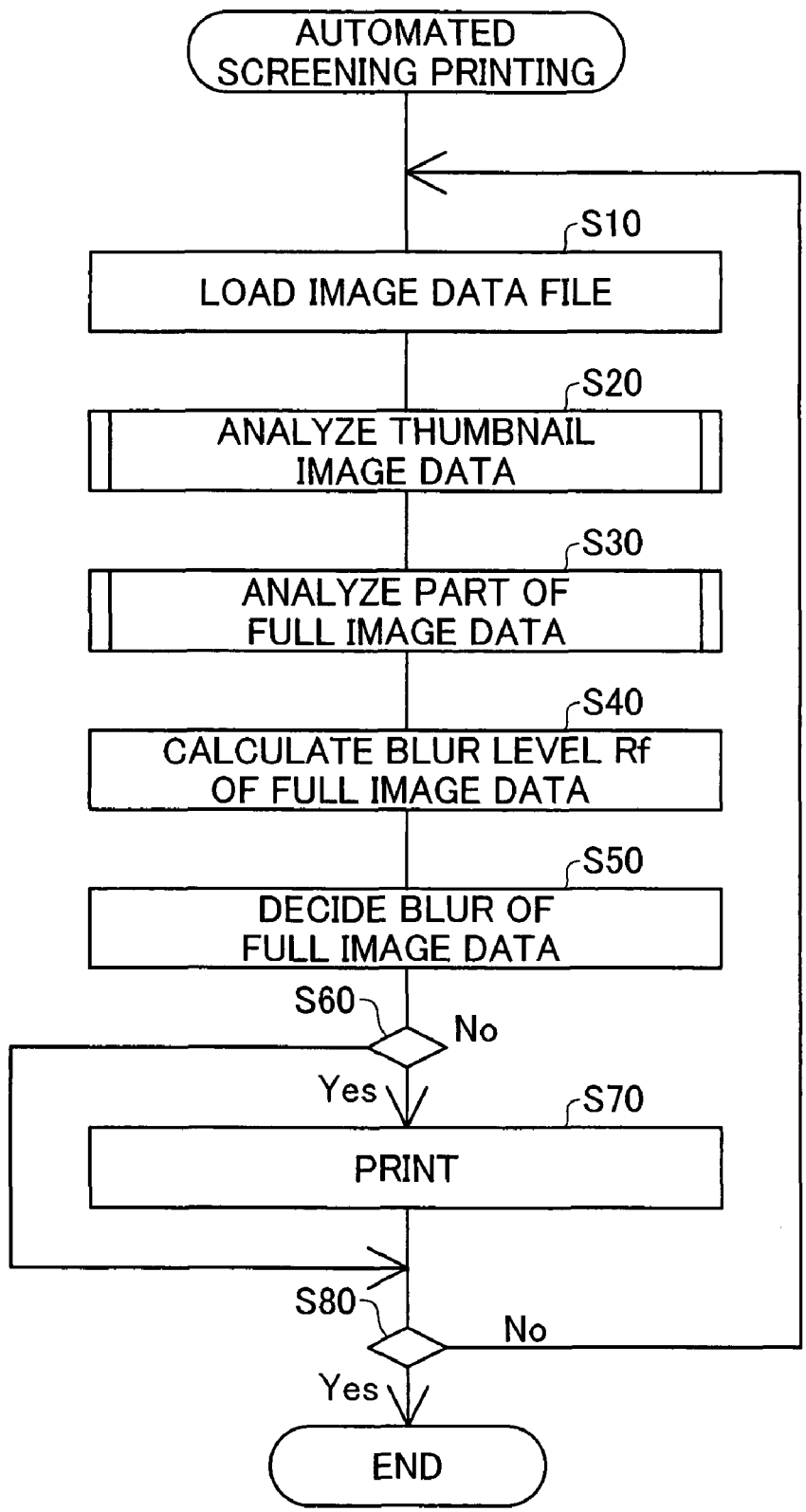
FIG. 2 is a flowchart showing the specifics of the "automated screening printing" process.

FIG. 2 is a flowchart depicting the specifics of the "Automated screening printing" process. "Automated screening printing" is a process whereby the printing device automatically selects and prints an image data file from among a number of image data files stored on a memory card. The process depicted in FIG. 2 is carried out by the CPU 100 once the memory card MC has been inserted into the card slot 70, and the user has pressed the "Memory Card" button of the mode button group 54 and then pressed the color print button 601 or the monochrome print button 602.

In Step S10, the CPU 1000 loads one of the image data files from the memory card MC into the main memory 150. The image data files stored on the memory card each include full image data and thumbnail image data.

The "thumbnail image data" for full image data refers to image data created on the basis of full image data, but with fewer pixels making up the image than with the full image data. The image of the thumbnail image data is a reduced image of the full image data. The functional module of the CPU 100 that loads the image data file in Step S10 is denoted in FIG. 1 as the data acquiring module 110.

In Step S20, the thumbnail image in the loaded image data file is a analyzed. Edge pixels within the thumbnail image are then determined. The principal process of Step S20 is carried out both in the horizontal direction and the vertical direction of the image. The specifics of analysis of thumbnail image data will be discussed later. The functional module of the CPU 100 that analyzes the thumbnail image data in Step S10 is denoted in FIG. 1 as the thumbnail image analyzing module 120.

In Step S30, of the full image data, data of edge division regions corresponding to the edge pixels (see Step S20) is analyzed. For each edge division region, a determination is made as to whether the photographic image is in-focus. Herein, an edge division region determined in Step S30 to be in-focus is termed a "focused region." On the other hand, a target region determined in Step S30 to be out-of-focus is termed an "unfocused region." The functional module of the CPU 100 that analyzes parts of the full image data (edge division regions) in Step S30 is denoted in FIG. 1 as the photographic image analyzing module 130.

In Step S40, a blur level Rf of the full image data is calculated on the basis of the number of focused regions in the image of the full image data. Specifically, the number of focused regions Nf in the image is divided by the sum of the number of focused regions Nf and the number of unfocused regions Nn to calculate the proportion Rf, as indicated by Expression (1) below.

$$Rf = Nf/(Nf+Nn) \qquad (1)$$

In Step S50, in the event that the blur level Rf of the image is equal to or greater than a prescribed threshold Thr, it is determined that the image is "in-focus" overall. Herein an image determined to be in-focus will be termed a "focused image." On the other hand, an image determined to be not in-focus will be termed an "unfocused image."

In Step S60, the process to be carried out subsequently is determined depending on whether the image of the image data file currently targeted for processing is a focused image. If the image data file is a focused image, in Step S70, an image of the image data file is printed out. On the other hand, if the image data file is an unfocused image, the process is Step S70 is skipped. The functional module of the CPU 100 that performs the processing of Steps S40 to S70 is denoted in FIG. 1 as the printing module 140.

In Step S80, a determination is made as to whether the process of Steps S10 to S60 has been carried out for all of the image data files on the memory card. In the event that the memory card MC still contains image data files for which the process of Steps S10 to S60 has not yet been carried out, the process returns to Step S10. In Step S10, one image data file is read from among the image data files not yet subjected to the process of Steps S10 to S60. If on the other hand the processing of Steps S10 to S60 has been carried out for all of the image data files on the memory card, the automated screening printing process terminates.

Figure 3:
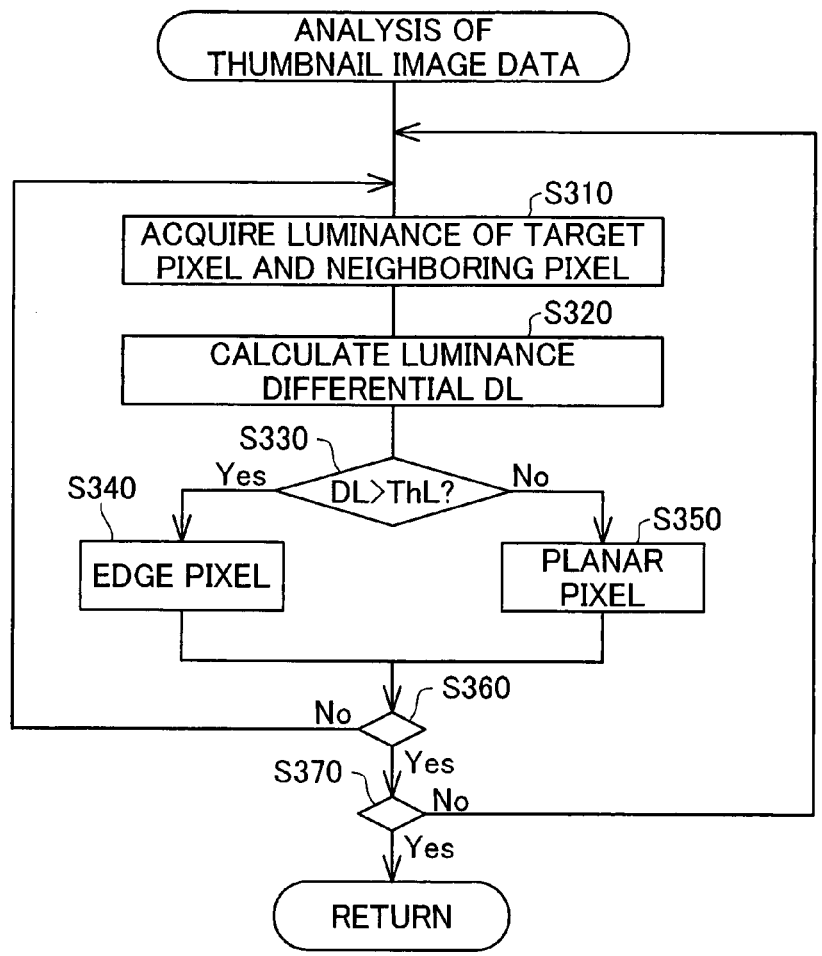
FIG. 3 is a flowchart showing the specifics of thumbnail image data analysis.

FIG. 3 is a flowchart showing the specifics of analysis of thumbnail image data (see Step S20 of FIG. 2). In Step S310, from the thumbnail image data of the image data file loaded in Step S10, luminance data is acquired for a single target pixel targeted for processing, and for a neighboring pixel neighboring the target pixel. Pixel luminance can be calculated on the basis of the tone value of red, green, or blue intensity of the pixel.

Figure 4:
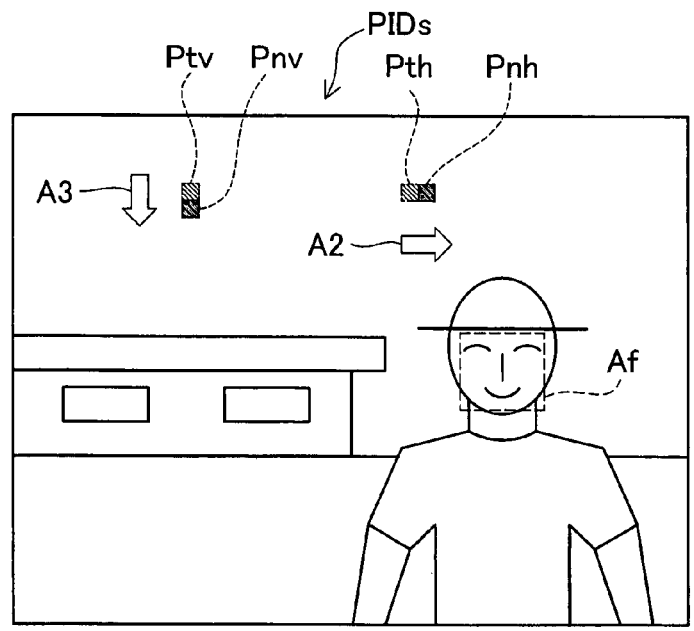
FIG. 4 depicts the image of full image data PID.

FIG. 4 is a drawing depicting an image of thumbnail data PIDs. The process of Steps S310 to S350 of FIG. 3 is carried out for both the horizontal direction and the vertical direction, for all pixels of the thumbnail image. Where analysis of the thumbnail image data is carried out for the horizontal direction, as a general rule the sequence of processing the target pixels will be one proceeding from left to right in the thumbnail image (see arrow A2 in FIG. 4).

Where analysis of the thumbnail image data is being carried out for the horizontal direction, the neighboring pixel Pnh whose luminance data is acquired in Step S310 will be the neighboring pixel to the right of the target pixel Pt. After reaching the next to last pixel from the right edge of the image, the pixel at the left edge of the row immediately below is designated as the next target pixel.

Where analysis of the thumbnail image data is being carried out for the vertical direction, as a general rule the sequence of processing the target pixels will be one proceeding from top to bottom in the thumbnail image (see arrow A3 in FIG. 4). Where analysis of the thumbnail image data is being carried out for the vertical direction, the neighboring pixel Pnv whose luminance data is acquired in Step S310 will be the neighboring pixel below the target pixel Pt. After reaching the next to last pixel from the bottom edge of the image, the pixel at the top edge of the next column to the right is designated as the next target pixel.

When a target pixel is mentioned without distinguishing between processing in the horizontal direction and processing in the vertical direction, it may sometimes be denoted as "target pixel Pt." Likewise, where a neighboring pixel is mentioned without distinguishing between processing in the horizontal direction and processing in the vertical direction, it may sometimes be denoted as "neighboring pixel Pn." The process of Steps S310 to S350 of FIG. 3 is carried first for the horizontal direction, and subsequently for the vertical direction.

In Step S320 of FIG. 3, a luminance differential DL of the target pixel and the neighboring pixel is calculated. In Step S330, determination is made as to whether the luminance differential DL is greater than a prescribed threshold ThL.

In the event that the luminance differential DL is greater than a prescribed threshold ThL, in Step S340 the target pixel is designated as an "edge pixel." If on the other hand the luminance differential DL is equal to or less than the prescribed threshold ThL, in Step S350 the target pixel is designated as a "planar pixel." An "edge pixel" is a pixel serving as a baseline when determining an edge block region targeted for processing in the process of Step S30 of FIG. 2.

The color of one pixel in a thumbnail image represents the average color of an image block corresponding to that pixel in the full image data. For this reason, it is highly probable that a target pixel selected on the basis of its level of brightness (here, luminance) as an edge pixel in the process of Step S310 to S340, and the pixel neighboring the target pixel, are pixels corresponding to two image blocks straddling the boundary of two regions of mutually different color. Specifically, it is highly probable that such image blocks will contain a boundary between physical objects of different color within the photographic image.

In Step S360, a determination is made as to whether the process of Steps S310 to S330 has been executed with regard to the horizontal direction, for all pixels of the thumbnail image. If there are pixels for which the process of Steps S310 to S330 has not been executed with regard to the horizontal direction, the process returns to Step S310. In Step S310, a pixel not yet subjected to processing is selected as the target pixel according to the sequence mentioned earlier, and luminance data is acquired for the target pixel and a neighboring pixel. If on the other hand the process of Steps S310 to S330 has been executed with regard to the horizontal direction for all pixels of the thumbnail image, the process moves on to Step S370.

In Step S370, a determination is made as to whether the process of Steps S310 to S330 has been executed with regard to the vertical direction, for all pixels of the thumbnail image. If there are pixels for which the process of Steps S310 to S330 has not been executed with regard to the vertical direction, the process returns to Step S310. Subsequently, in Steps S310 to S350, processing is carried out with regard to the vertical direction. If on the other hand, processing in the horizontal direction and in the vertical direction has been executed for all pixels of the thumbnail image, analysis of the thumbnail image data terminates.

Figure 5:
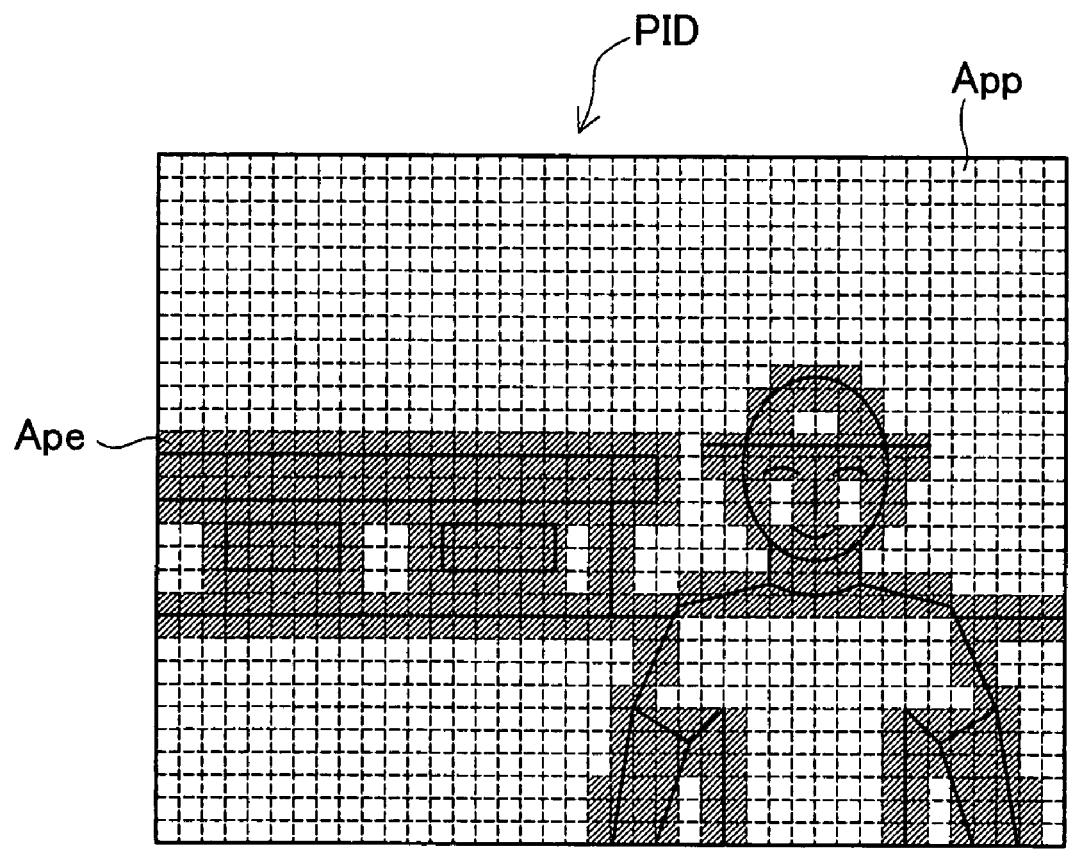
FIG. 5 depicts edge block regions Ape and a planar block regions App in the image of full image data PID.

FIG. 5 is a diagram depicting edge block regions Ape and a planar block regions App, in an image of full image data PID. Since the image of the thumbnail image PIDs is derived by reducing the image of the full image data PID, the thumbnail image PIDs of FIG. 4 and the full image data PID of FIG. are substantially identical images.

In FIG. 5, regions divided by broken lines respectively represent block regions corresponding to single pixels in the thumbnail image. Block regions shown with hatching are edge block regions Ape corresponding to edge pixels (see Step S340 of FIG. 3). As shown in FIGS. 4 and 5, edge block regions Ape corresponding to edge pixels are highly likely to include a boundary between objects of different color in the image of the full image data PID. FIGS. 4 and 5 are intended to provide an overview of the process, and do not reflect actual data.

In Step S30 of FIG. 2, only the edge block regions Ape are analyzed, rather than all regions of the image of the full image data PID (see the hatched portions in FIG. 5). Consequently, determinations as to whether a photographic image is in-focus or not can be made with a lower processing load than when pixels of all regions of an image are analyzed.

Figure 6:
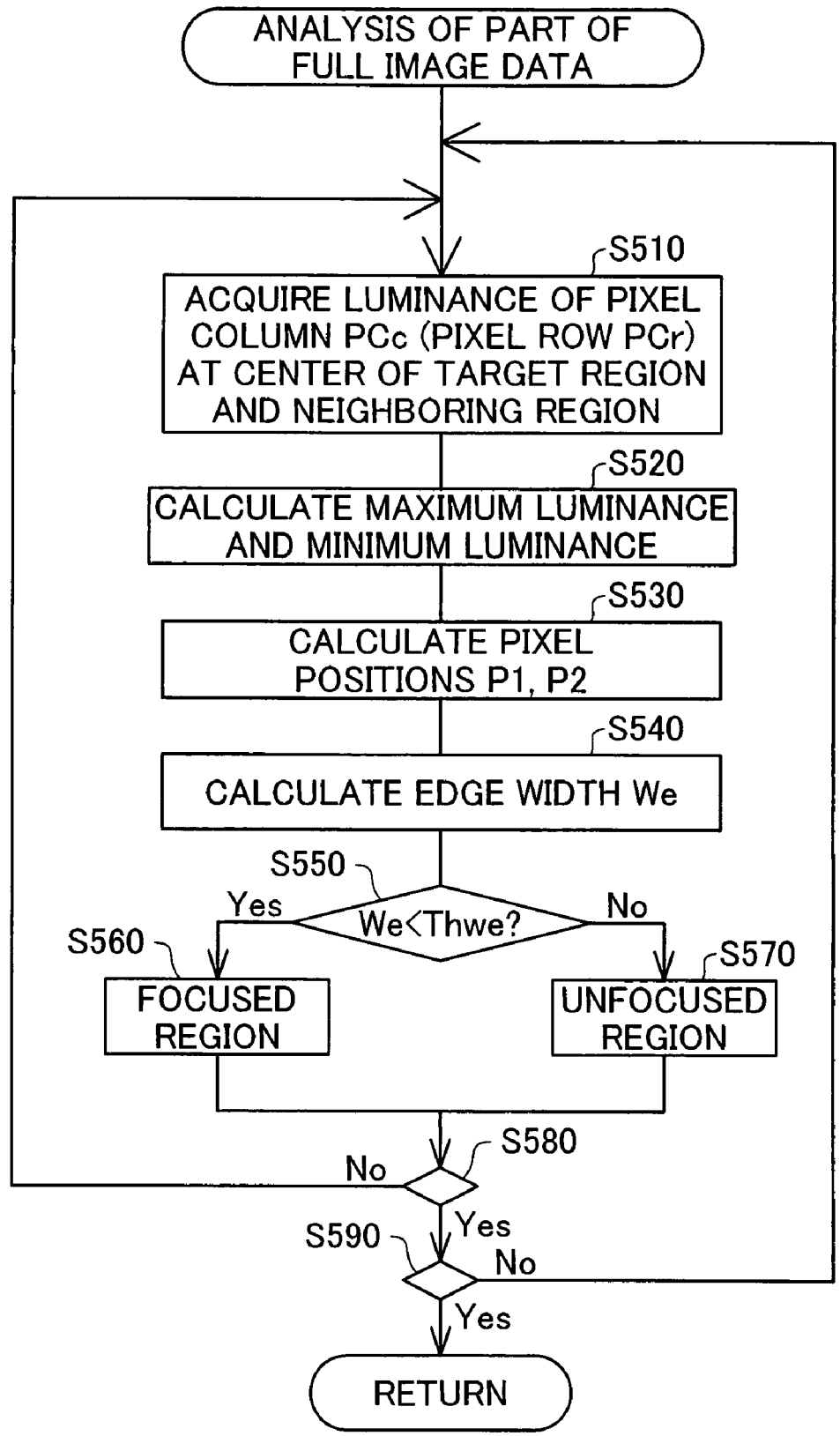
FIG. 6 is a flowchart showing the specifics of analysis of full image data.

FIG. 6 is a flowchart showing the specifics of analysis of full image data (see Step S30 of FIG. 2). In Step S510, one target region Apt is selected from among the several edge block regions Ape shown in FIG. 5. Then, luminance data for some of the pixels in the target region Apt and neighboring region Apn neighboring the target region Apt is obtained from the full image data.

The processes of Steps S510 to S550 is carried out for both the horizontal and vertical directions, for each edge block region of the full image data corresponding to an edge pixel of the thumbnail image data. Where analysis of the thumbnail image data is carried out for the horizontal direction, the neighboring region whose luminance data is obtained in Step S510 will be the region lying adjacently to the right of the target pixel. Where analysis of the thumbnail image data is carried out for the vertical direction, the neighboring region whose luminance data is obtained in Step S510 will be the region lying adjacently below the target pixel. The processes of Steps S510 to S550 are carried out initially for the horizontal direction, and subsequently for the vertical direction.

Figure 7A:
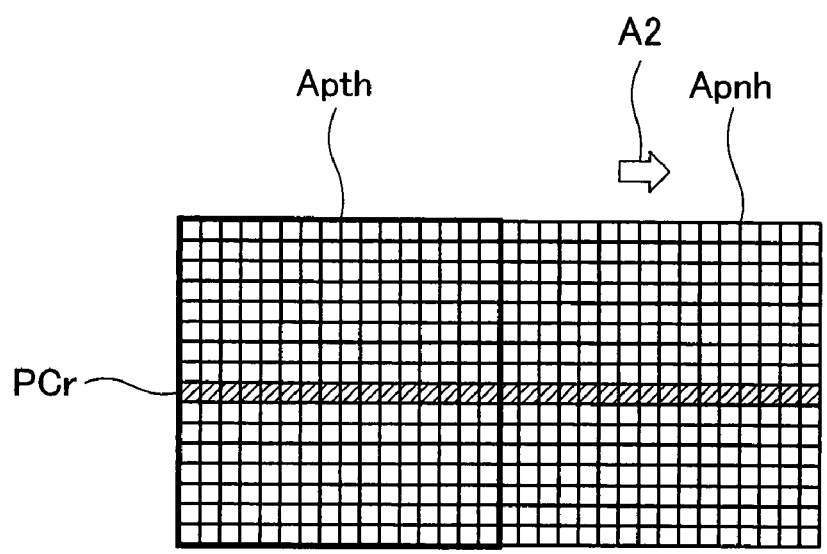
FIG. 7A depicts the content of the process of Step S510.
Figure 7B:
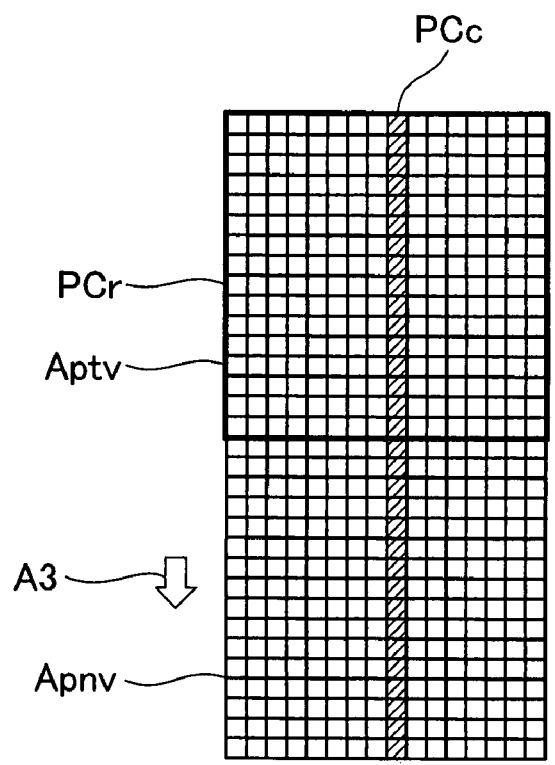
FIG. 7B depicts the content of the process of Step S510.

FIGS. 7A and 7B are diagrams depicting the content of the process of Step S510. In FIGS. 7A and 7B, the regions bordered by the heavy lines are the target regions Apt. FIG. 7A shows a target region Apth corresponding to an edge pixel, and a neighboring region Apnh lying adjacently to the right of the target region Apth, which have been selected during analysis of thumbnail image data for the horizontal direction (see Steps S310 to S360 of FIG. 3, and target pixel Pth and neighboring pixel Pnh of FIG. 4). FIG. 7B shows a target region Aptv corresponding to an edge pixel and a neighboring region Apnv lying adjacently below the target region Aptv, which have been selected during analysis of thumbnail image data for the vertical direction, (see Steps S310 to S360 of FIG. 3, and target pixel Ptv and neighboring pixel Pnv of FIG. 4).

Where a target region is mentioned without distinguishing between the target region Apth and the target region Aptv, it will be denoted as a "target region Apt." Where a neighboring region is mentioned without distinguishing between the neighboring region Apnh and the neighboring region Apnv, it will be denoted as a "neighboring region Apn."

Where the process of Step S510 is carried out for the horizontal direction (see arrow A2 in FIG. 7A), among the pixels contained in the target region Apth and the neighboring region Apnh, luminance data is acquired for pixels contained in the row PCr of pixels. In FIG. 7A, the pixel row PCr is depicted with hatching.

The pixel row PCr is a row of pixels situated substantially at the center in the vertical direction and lined up in the horizontal direction, within the target region Apt and the neighboring region Apnh. The direction of the pixel row PCr is equivalent to the direction in which the target pixel Pth and the neighboring pixel Pnh lie when processing is carried for the horizontal direction in Step S310 of FIG. 3. The direction of the arrow A2 in FIG. 7A corresponds to the direction of the arrow A2 in FIG. 4. In the example of FIGS. 7A and 7B, the target region Apt and the neighboring region Apnh are each 16×16 pixels, and thus the pixel row PCr is the ninth row of pixels from the top.

On the other hand, where the process is carried out for the vertical direction (see arrow A3 in FIG. 7B), in Step S510, among the pixels contained in the target region Aptv and the neighboring region Apnv, luminance data is acquired for pixels contained in the column PCc of pixels situated substantially at the center in the horizontal direction and lined up in the vertical direction. In FIG. 7B, the pixel row PCc is depicted with hatching. The direction of the pixel row PCc is equivalent to the direction in which the target pixel Ptv and the neighboring pixel Pnv lie when processing is carried for the vertical direction in Step S310 of FIG. 3. The direction of the arrow A3 in FIG. 7B corresponds to the direction of the arrow A3 in FIG. 4. In the example of FIG. 7B, the pixel row PCc is the ninth column of pixels from the left.

In the present embodiment, the focus determination process is carried out based only on luminance data for some pixels among the pixels of the target region Apt and the neighboring region Apn. For this reason, focus determinations for photographic images entail a lower processing load, as compared to the case where data for all pixels of the target region Apt and the neighboring region Apn is processed.

There is a high probability that a color boundary lies in the direction of boundary between the target region Apt and the neighboring region Apn (the vertical direction in FIG. 7A, or the horizontal direction in FIG. 7B). Consequently, the blur level of the color boundary area can be determined using luminance data for pixels lined up in the perpendicular direction with respect to the direction of boundary between the target region Apt and the neighboring region Apn.

In the present embodiment, determination of blur level is carried out using luminance data for a pixel row (pixel column) located substantially in the center of the direction of the boundary of the target region Apt and the neighboring region Apn. Thus, even if the color boundary only partially presents within the target region Apt and the neighboring region Apn, there is a high probability that information representing luminance of the color boundary area can be acquired.

Figure 8:
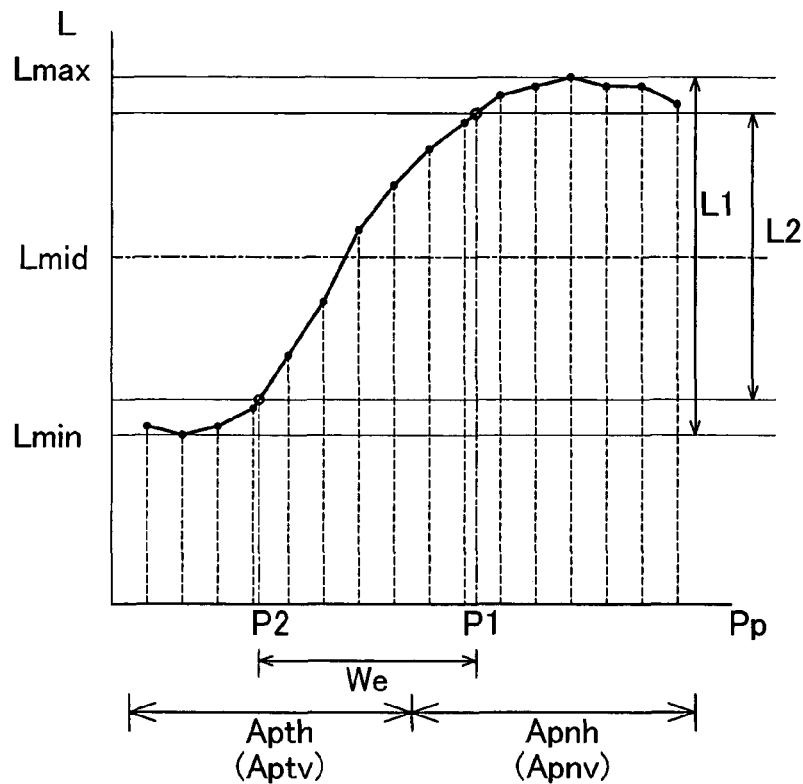
FIG. 8 shows luminance of pixels contained in the pixel row PCc.

FIG. 8 is a graph showing luminance of pixels contained in the pixel row PCr (see FIG. 7A). The horizontal axis of the graph gives pixel position, and the vertical axis gives luminance L. In FIG. 8, in order to simply description, only eight points representing pixel luminance are shown respectively, for the target region Apt and the neighboring region Apn.

In Step S520 of FIG. 6, a maximum luminance Lmax and a minimum luminance Lmin are calculated from among the luminance values of the pixels whose luminance data was acquired.

In Step S530, there is calculated a luminance range L2 that is centered on the medium luminance Lmid between the maximum luminance Lmax and the minimum luminance Lmin (Lmid=(Lmax+Lmin)/2), and whose range is equivalent to 80% of the difference L1 between the maximum luminance Lmax and the minimum luminance Lmin. The pixel position P1 at the upper end of the luminance range L2 and the pixel position P2 at the lower end are then calculated. In the example of FIG. 8, it is postulated that a region of given color lies to the left of the pixel position P2, and that a region of another given color lies to the right of the pixel position P1. The region extending from the pixel position P1 to P2 is the boundary between the regions of the two colors.

In Step S540 of FIG. 6, the interval between the pixel positions P1 and P2 is calculated by way of the edge width We of the two color regions. Greater edge width We is considered indicative of blur of an image.

While here the process of calculating edge width We for the horizontal direction has been described using FIG. 8, an analogous process is carried out where processing is performed for the vertical direction as well.

In Step S550, a determination is made as to whether the edge width We is smaller than a prescribed threshold Thwe. In the event that the edge width We is smaller than a prescribed threshold Thwe, in Step S560 the target region is designated a focused region. On the other hand, in the event that the edge width We is equal to or greater than a prescribed threshold Thwe, in Step S570 the target region is designated an unfocused region.

In Step S580, a determination is made as to whether the processes of Steps S510 to S550 for the horizontal direction have been executed for edge block regions (see FIG. 5) corresponding to all edge pixels of the thumbnail image. In the event that there are any edge block regions for which the processes of Steps S510 to S550 of the horizontal direction have not yet been executed, the process returns to Step S510. In Step S510, an edge block region not yet subjected to processing is selected as the target region in the order mentioned earlier, and luminance data is acquired for some pixels in the target region and a neighboring region. If on the other hand there are no edge block regions for which the processes of Steps S510 to S550 of the horizontal direction have not yet been executed, the process advances to Step S590.

In Step S590, a determination is made as to whether the processes of Steps S510 to S550 in relation to the vertical direction have been executed for edge block regions corresponding to all edge pixels of the thumbnail image. In the event that processing has not yet been executed for the vertical direction, the process returns to Step S510. Subsequently, processing is executed for the vertical direction in Steps S510 to S550. If on the other hand processing has been executed for the horizontal direction and the vertical direction for all of the edge block regions, analysis of the full image data terminates.

By carrying out the processes discussed above, the printer 1 of Embodiment 1 can determine with a low processing load whether an image of image data is blurred or distinct. For this reason, image data files of distinct images can be selected automatically for printing, from among multiple image data files.

B. Embodiment 2

In Embodiment 1, there is a one-to-one correspondence between one pixel of a thumbnail image, and a block region of the full image (see FIGS. 4 and 5). Edge width We is calculated on the basis of luminance at pixel positions in a target region Apt and a neighboring region Apn (see FIG. 8). In Embodiment 2, the size of block regions of the full image is constant and not dependent on the size of the full image or the thumbnail image. For this reason correspondence between one pixel of a thumbnail image and a block region of the full image is not limited to one-to-one correspondence. Also, edge width We is determined on the basis of a DCT coefficient of block regions. In other respects, Embodiment 2 is the same as Embodiment 1.

Figure 9:
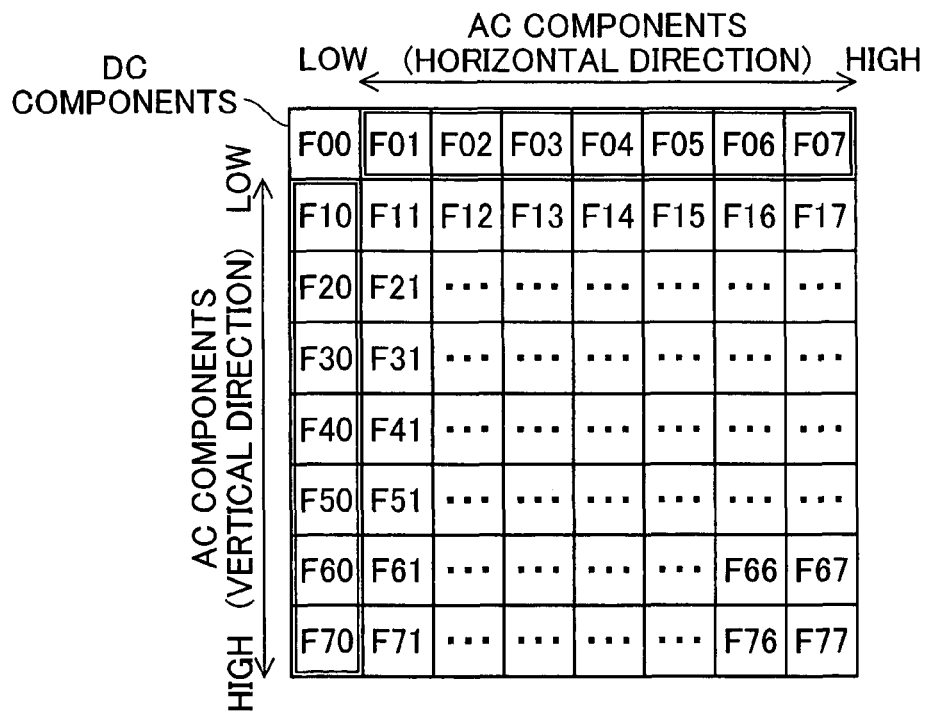
FIG. 9 depicts DCT coefficients for an image of a target region in which image data is stored in JPEG format.

FIG. 9 is a diagram depicting DCT coefficients for an image of a target region in which image data is stored in JPEG format. The JPEG format image data stores coefficients (DCT coefficients) F00-F77 representing frequency components of a number of discrete frequencies, for the image of each target region constituting a small region of 8×8 pixels obtained by dividing regions of an image. The DCT coefficients are derived by discrete cosine transform of data representing luminance of pixels of the image of the target region. A total of 64 DCT coefficients (eight lines for frequency in the vertical direction×eight columns for frequency in the horizontal direction) are stored for each target region.

The DCT coefficient F00 represents the average value of luminance in the target region (8×8 pixels). This coefficient is termed the "DC component." Meanwhile, the other 63 DCT coefficients F01-F77 are termed "AC components." These DCT coefficients F01-F77 represent frequency components when the luminance levels of pixels of the target region are approximated by superimposing cosine waves of mutually different frequency.

The seven DCT coefficients F01-F07 lined up in the horizontal direction in the drawing represent frequency components obtained when luminance level in the horizontal direction derived by respective averaging of luminance of pixels of the target region in the vertical direction is approximated by superimposing cosine waves of each frequency. In FIG. 9, coefficients further to the left represent frequency components of lower frequency, while coefficients further to the right represent frequency components of higher frequency.

Meanwhile, the seven DCT coefficients F10-F70 lined up in the vertical direction in the drawing represent frequency components obtained when luminance level in the vertical direction derived by respective averaging of luminance of pixels of the target region for the horizontal direction is approximated by superimposing cosine waves of each frequency. In FIG. 9, coefficients further towards the bottom represent frequency components of higher frequency, while coefficients further towards the top represent frequency components of lower frequency.

In Embodiment 2, when calculating edge width We for the horizontal direction, the DCT coefficients F01-F07 are matched with basic patterns created in advance, and the blur width Bw associated with the most closely approximating basic pattern is designated the edge width We for the target region.

When calculating edge width We for the vertical direction, the DCT coefficients F10-F70 are matched with basic patterns created in advance, and the blur width Bw associated with the most closely approximating basic pattern is designated the edge width We for the target region.

Figure 10:
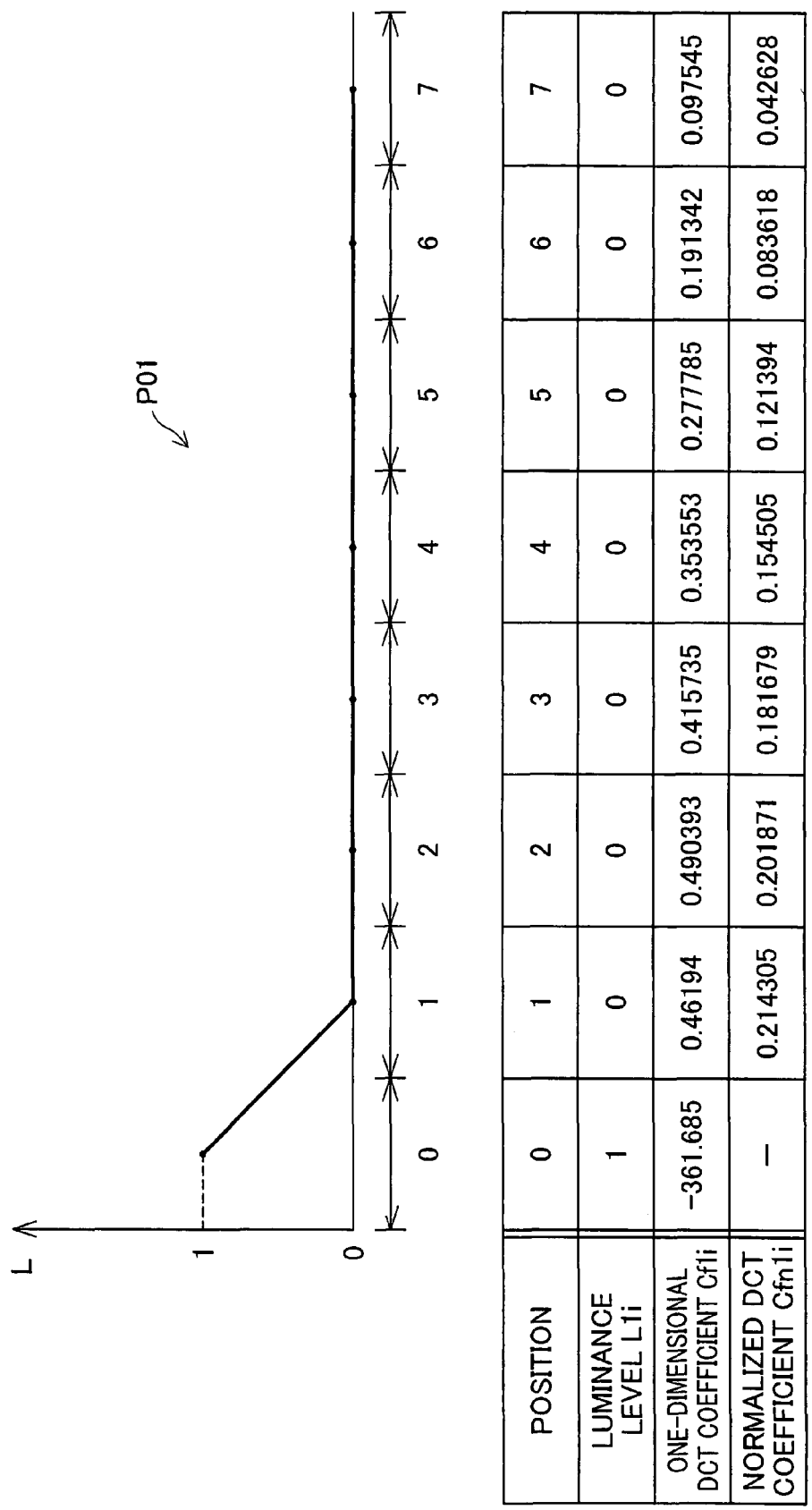
FIG. 10 depicts luminance levels $L1i$ of a basic pattern P01, one-dimensional DCT coefficients $Cf1i$, and normalized DCT coefficients $Cfn1i$ (i=1-7)

FIG. 10 is a diagram depicting luminance levels L1$i$ of a basic pattern P01, one-dimensional DCT coefficients Cf1$i$, and normalized DCT coefficients Cfn1$i$ ($i$=1-7). As shown at top in FIG. 10, the basic pattern P01 represents a pattern of change in luminance having a luminance level of 1 at pixel position 0, and luminance levels of 0 at pixel positions 1 to 7, and in which luminance level drops in linear fashion going from pixel position 0 to 1. This basic pattern P01 is represented by eight parameters which are discrete luminance levels L1$i$ ($i$=1-7), shown at bottom in FIG. 10.

The eight parameters Cf1$i$ ($i$=0-7) appearing in the second row of the table are one-dimensional DCT coefficients derived by performing one-dimensional DCT on luminance levels L1$i$ ($i$=1-7). The normalized DCT coefficients Cfn1$i$ are coefficients derived by normalization, according to Expression (2) below, of the absolute values of seven one-dimensional DCT coefficients ($i$=1-7) taken from among the eight one-dimensional DCT coefficients ($i$=0-7). In the example of FIG. 10, j=1.

$$Cfnji = \frac{|Cfji|}{\sum_{k=1}^{7} |Cfjk|} \quad (2)$$

$$\left( \begin{array}{l} i = 1 \sim 7 \\ j = 01 \sim 07, 11 \sim 15, 21 \sim 23, 31 \end{array} \right)$$

These seven normalized DCT coefficients Cfn1$i$ for the basic patterns Pj (j is 01-07, 11-15, 21-23, 31) have been previously stored in the ROM 160 (see FIG. 1).

Figure 11:
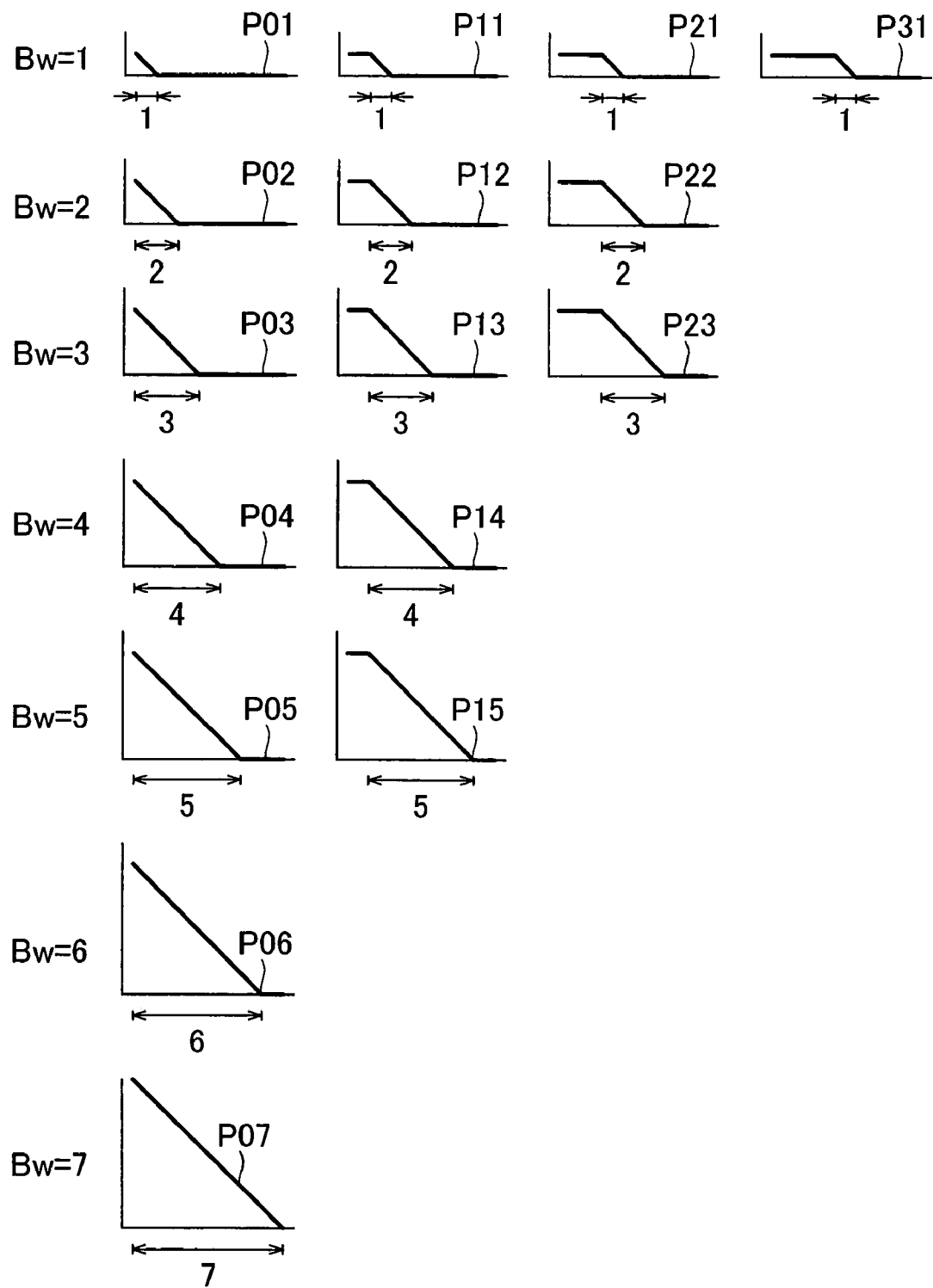
FIG. 11 depicts 16 basic patterns Pj of luminance change (j is 01-07, 11-15, 21-23, 31)

FIG. 11 is a diagram depicting 16 basic patterns Pj of luminance change (j is 01-07, 11-15, 21-23, 31). In each basic pattern Pj, the vertical axis represents luminance level and the horizontal axis represents pixel position. The basic patterns Pj shown in FIG. 11, like the pattern P01 shown at top in FIG. 10, represent luminance levels at eight pixel positions.

Each of the basic patterns Pj is assigned a blur width Bw equivalent to the number of pixels making up the region of change (drop) in luminance level (in FIG. 11, this number is shown below each basic pattern Pj). In FIG. 11, basic patterns assigned equivalent blur width Bw are lined up in the horizontal direction. Of the basic patterns lined up in the horizontal direction, in those shown further towards the left the drop in luminance level occurs at a position closer to the left. The basic patterns Pj do not overlap even if flipped top to bottom or left to right.

In virtually all cases, an area of a full image corresponding to an edge pixel of a thumbnail image will be a block region larger than 8×8 pixels. In Embodiment 2, when the edge width We is calculated for the horizontal direction for example, processing is carried out for all 8×8 pixel target regions contained in a full image block region corresponding to an edge pixel.

Specifically, the normalized coefficients Fr0$i$ (i=1-7) of a target region are compared with the normalized DCT coefficients Cfnji of the basic patterns Pj of luminance change, selecting the basic pattern Pj which affords the smallest difference. The blur width Bw of that basic pattern (see FIG. 11) is then designated as the edge width We of the target region.

In the event that difference between the normalized coefficients Fr0$i$ (i=1-7) of a target region and the normalized DCT coefficients Cfnji of the basic patterns Pj of luminance change is not less than a prescribed threshold, it is determined that no color boundary is present in the target region, and the edge width calculation is not performed.

Where change in luminance of neighboring block regions meets conditions such as (1) to (3) below, the edge width of the target region will be replaced by means of the following process. The conditions are: (1) in each case, the associated basic pattern is a basic pattern P01-P07 wherein the position of the change in luminance is the left edge of the pattern; (2) the positions of the change in luminance face one another (for example, the position of change in luminance is at the right edge in the block region on the left side, while the position of change in luminance is at the left edge in the block region on the right side, etc.); and (3) the direction of change in luminance is the same (e.g. luminance drops going from left to right in the block region, etc.).

FIG. 12 is a table depicting relationships between direction of pattern luminance change and sign of the DCT coefficients. In FIG. 12, the example of basic pattern P01 is shown. In the event that the pattern of luminance change in the target region has the same direction as the basic pattern P01 (P01$a$ in FIG. 12), the sign of the DCT coefficient F01 of the target region is positive (indicated by a "+" in the drawing). The sign of the DCT coefficient F02 of the target region is the same as the sign of the DCT coefficient F01 of the target region (indicated by a "=" in the drawing), and is therefore positive.

As shown in FIG. 12, the pattern P01$a$ which is identical to the basic pattern P01, and the patterns P01$b$-P01$d$ derived by flipping the basic pattern P01 left to right and top to bottom respectively, differ from one another in terms of the combination of sign (+/−) of the DCT coefficient F01, with identity/difference (=/≠) between the signs of the DCT coefficients F01 and F02. Here, the basic pattern P01 is shown by way of example, but the other basic patterns Pj are similar. For this reason, the direction of the pattern of luminance change can be determined on the basis of the signs of the DCT coefficients F01 and F02 of the target region.

For block regions that meet the aforementioned conditions (1)-(3), the edge width We will be replaced by the total blur width Bw of the basic patterns associated with the respective block regions. For example, in the event that the basic pattern associated with a certain first block region is the basic pattern P01 (Bw=1) and the basic pattern associated with a second block region neighboring to the right side the first block region is the basic pattern P02 (Bw=2), the edge width We of the first and second block regions will each be replaced by 3.

By carrying out such an edge linking process, even if the edge (contour) of a color region in an image is blurred over a width exceeding 8 pixels, the blur width thereof can be determined correctly nevertheless. While the above discussion pertained to linking in the horizontal direction, the edge linking process in the vertical direction can be carried out analogously.

In Embodiment 2 as well, it is possible to determine whether an image data file is blurred, with a minimum of processing load. In Embodiment 2, edge width is determined using DCT coefficients. For this reason, the focus determining process can be carried out without having to convert a full image data file of JPEG format into image data of a format having color information for each pixel. Therefore, there is less processing load during focus determination, as compared with Embodiment 1.

C. Modified Examples

The present invention is not limited to the embodiments set forth hereinabove, and may be reduced to practice in various ways without departing from the spirit thereof, for example through modifications such as the following.

C1. Modified Example 1

In Embodiment 1, luminance of each pixel is employed as the criterion for edge pixel (specific pixel) selection. However, during specific pixel selection, the specific pixel can be selected on the basis of some other pixel tone value. For example, the specific pixel can be selected on the basis of a tone value representing intensity of red, green, or blue, instead of luminance.

C2. Modified Example 2

In Embodiment 1, a luminance range L2 of a range equivalent to 80% of the difference L1 between the maximum luminance Lmax and the minimum luminance Lmin is calculated for determining the edge width We. However, edge width could be calculated by some other method instead. For example, the interval between the pixel position of the maximum luminance Lmax and the pixel position of the minimum luminance Lmin could be designated as the edge width We. Also, the size L1 of the luminance range L2 could be set to some other value, such as 90% or 70%.

C3. Modified Example 3

In Embodiment 1, luminance data is acquired for a row PCr of pixels and a column PCc of pixels located substantially in the center of the target region Apt and the neighboring region Apn; and edge width We was calculated by way of the localized blur level (see FIGS. 7 and 8). However, localized blur level for a block region which is part of an image can be calculated by some other method.

For example, luminance (or some other tone value) data could be acquired for two or more rows of pixels and two or more columns of pixels located substantially in the center of the target region Apt and the neighboring region Apn; and localized blur level calculated on the basis of this data.

As another example, data could be acquired for a first pixel row constituting one or more rows of pixels situated substantially at the center of the target region Apt and the neighboring region Apn, a second pixel row situated above the first pixel row and composed of pixels that do not neighbor the pixels of the first pixel row, and a third pixel row situated below the first pixel row and composed of pixels that do not neighbor the pixels of the first pixel row; and the localized blur level calculated on the basis of this data. Where carrying out the process of the vertical direction, selection can be done in the same manner.

Furthermore, it would be possible to calculate the edge width We in the same manner as in Embodiment 1 for several pixel rows or all pixel rows contained in the target region Apt and the neighboring region Apn, and to designate the largest edge width from among these as the localized blur level for the target region Apt. Alternatively, the smallest edge width from among edge widths calculated in this way can be designated as the localized blur level for the target region Apt. Localized blur level can be calculated similarly where the process is carried out in the vertical direction as well.

During calculation of localized blur level for the horizontal direction, it would also be possible to calculate averages of luminance (or other tone value) of pixels lined in up the vertical direction in the target region Apt and the neighboring region Apn, and to then calculate localized blur level on the basis of change in this average values in the horizontal direction (FIG. 8). Similarly, during calculation of localized blur level for the vertical direction, it would also be possible to calculate averages of luminance (or other tone value) of pixels lined in up the horizontal direction in the target region Apt and the neighboring region Apn, and to then calculate localized blur level on the basis of change in this average values in the vertical direction (FIG. 8).

C4. Modified Example 4

In the embodiments hereinabove, the thresholds (e.g. the threshold ThL of Step S330 in FIG. 3 and the threshold Thwe of Step S550 in FIG. 6) were fixed values. However, thresholds can be selected according to the characteristics of image data. For example, it is preferable to select thresholds for use in the determinations made in each step, according to the brightness of the image of the image data. This is because even where similar levels of luminance have about the same extent of difference, noticeability thereof to the human eye will differ depending on the absolute value of luminance. Similarly, for similar edge widths, noticeability to the human eye will differ depending on the luminance level of the portion of the image where the edge is located.

Also, in preferred practice, thresholds will be established according to the red, green, or blue color components. The reason is that for different colors, identical tone differences or identical edge widths will differ in terms of noticeability to the human eye.

C5. Modified Example 5

In the embodiments hereinabove, in the event that the proportion Rf derived by dividing the number of focused regions Nf in an image by the sum of the number of focused regions Nf and the number of unfocused regions Nn is equal to or greater than a prescribed threshold Thrf, the image of the image data file is determined to be a focused image (see Steps S40 and S50 of FIG. 2). Then, a region with edge width We smaller than a prescribed threshold Thwe is determined to be a focused region (see Steps S550, S560 of FIG. 6). However, the determination of whether an image is a focused image can be made using some other method.

For example, a photographic image can be determined to be a focused image in the event that the photographic image contains a rectangular region of prescribed size in which focused regions having edge width (localized blur level) smaller that a first baseline value are present and a number of such focused regions in the rectangular regions is greater than a second baseline value. With such an embodiment, an image that is in-focus for a range of particular importance to the user (e.g. a facial region portraying a face) can be determined to be a focused image, even if other parts of the image are out-of-focus.

A photographic image can also be determined to be a focused image in the event that a target region of edge width (localized blur level) smaller than a first baseline value is present in the photographic image. With such an embodiment, even in the event that the user has shot a photograph while focusing on an object that appears small within the image, it is possible nevertheless to determine that the photographic image is a focused image.

Furthermore, regions of a photographic image can be divided into a first region in proximity to the center, and a second region in proximity to the perimeter and surrounding the first region; and the photographic image determined to be a focused image in the event that this first region contains at least a prescribed number or a prescribed proportion of focused regions. By means of such an embodiment, it is possible to determine that a photograph taken with a human subject at the center, with the subject in-focus and the background blurred, is in fact a focused image.

That is, the determination as to whether a photographic image is a focused image can be made by comparing to a threshold the blur level of the photographic image as a whole determined by a statistical method on the basis of localized blur levels of specific regions within the photographic image.

C6. Modified Example 6

In Embodiment 2, the image data is image data having frequency coefficients derived by discrete cosine transform (DCT). The basic patterns are stored in ROM 160, in the form of coefficients derived by similar discrete cosine transform (DCT). However, in another possible embodiment the image data can have frequency coefficients derived by some other orthogonal transform. In such an embodiment, the basic patterns will preferably be stored as coefficients derived by the same orthogonal transform as well. Examples of orthogonal transforms are discrete cosine transform, discrete Fourier transform, discrete sine transform, and other such normalized orthogonal transforms.

C7. Modified Example 7

In the embodiments hereinabove, comparison of pixel luminance in the thumbnail image (see Step S310 of FIG. 3) is carried out for the thumbnail image overall. However, in another possible embodiment the comparison of pixel luminance (or other tone value) in the thumbnail image can be carried out only for a region representing part of the thumbnail image. For example, in a possible embodiment, the luminance comparison can be carried out only for pixels within a facial region where a human face appears (see region Af of FIG. 4) in the thumbnail image. With such an embodiment, the determination as to whether a photographic image is a focused image can be made with less processing load, as compared to where luminance comparison is carried out for the entire thumbnail image.

In another possible embodiment, all of pixels within a facial region where a human face appears (see region Af of FIG. 4) can be designated as specific pixels, and localized blur level calculated for block regions corresponding to the specific pixels (see Step 30 in FIG. 2, and FIGS. 6 and 7). With such an embodiment, the focus determination can be made with less processing load, as compared to where focus of the full image is determined through analysis of all pixels of the full image.

A facial region may be identified by a process such as the following. Specifically, a characteristic point pc is extracted from the image of the thumbnail image PIDs. Hereinafter, an image having such a characteristic point shall be termed a "characteristic point-extracted image." After creating the characteristic point-extracted image, a previously created template is moved parallel to, enlarged/reduced, and rotated with respect to the characteristic point-extracted image, and degree of similarity of the template to the parts of the characteristic point-extracted image is calculated. In the event that there is a part for which the degree of similarity exceeds a prescribed threshold, a prescribed region containing that part is determined to be a "facial region."

C8. Modified Example 8

While the embodiments hereinabove described examples in which the printer is able to carry out printing independently, the present invention can also be implemented as a computer able to carry out a process to determine whether an image of image data is blurred.

In such an embodiment, a process such as the following can be carried out on the basis of the number of unfocused regions Neh and edge width Weh of the respective unfocused regions determined when the process is performed for the horizontal direction, and of the number of unfocused regions Nev and edge width Wev of the respective unfocused regions determined when the process is performed for the vertical direction.

For example, in the event that in an unfocused image (Neh/Nev) is greater than a prescribed first threshold Th1 (1<Th1), it can be determined that the image is one containing camera shake in a direction approximating the horizontal direction. Specifically, in the event that the number of unfocused regions in relation to the horizontal direction exceeds by at least a certain extent the number of unfocused regions in relation to the vertical direction, it can be determined that the image is one containing camera shake in a direction approximating the horizontal direction.

On the other hand, in the event that in an unfocused image (Neh/Nev) is smaller than a prescribed second threshold Th2 (0<Th2<1), it can be determined that the image is one containing camera shake in a direction approximating the vertical direction. Specifically, in the event that the number of unfocused regions in relation to the vertical direction exceeds by at least a certain extent the number of unfocused regions in relation to the horizontal direction, it can be determined that the image is one containing camera shake in a direction approximating the vertical direction.

In the event that in an unfocused image (Neh/Nev) is at least equal to the prescribed first threshold Th1 and does not exceed the prescribed second threshold Th2, it can be determined that the image is out of-focus. Specifically, in the event that the number of unfocused regions in relation to the vertical direction and the number of unfocused regions in relation to the horizontal direction approximate one another by at least a certain extent, it can be determined that the image is out of-focus.

The direction of camera shake can be calculated on the basis of the magnitude of edge width Weh of unfocused regions in the horizontal direction, and the magnitude of edge width Wev of unfocused regions in the vertical direction. For example, for both the horizontal direction and the vertical direction, vectors whose components are the horizontal direction edge width Weh and the vertical direction edge width Wev are derived for block regions determined to be unfocused regions. Then, by means of carrying out statistical treatment of the vectors whose components are the horizontal direction edge width Weh and the vertical direction edge width Wev derived for both the horizontal direction and the vertical direction for block regions determined to be unfocused region for both the horizontal direction and the vertical direction, the direction of camera shake in the image as a whole can be determined.

Information indicating whether the image having undergone the treatment described above is a camera shake image, and information regarding the direction of camera shake, can be created as additional data for attachment to the image data file.

C9. Modified Example 9

In the embodiment, the printer 1 is furnished with a card slot 70 for reading data from an inserted memory card. However, the printer 1 could instead be furnished with other means besides a card slot 70, for receiving image data files. For example, the printer 1 could be provided with a communications module able to receive image data files from the outside via a wired or wireless communications network.

C10. Modified Example 10

In the embodiments hereinabove, some of the elements realized through hardware could instead be replaced by software, and conversely some of the elements realized through software could instead be replaced by hardware. For example, some of the functions of the CPU 100 of the printer 1 could be executed by a computer connected to the printer.

A computer program for implementing such functions could be provided in a form recorded onto a floppy disk, CD-ROM, or other such computer-readable recording medium. The host computer would read the computer program from the recording medium, and transfer it to an internal storage device or external storage device. Alternatively, the computer program could be provided to the host computer from a program supply device via a communication pathway. When implementing the functions of the computer program, the computer program stored in the internal storage device will be executed by the microprocessor of the host computer. The computer program recorded onto the recording medium can also be executed directly by the host computer.

The term host computer herein a concept that includes both hardware devices and the operating system, and refers to hardware devices operating under control by the operating system. In such a host computer, the computer program implements the functions of the parts discussed above. Some of the functions could be implemented by the operating system, rather than by application programs.

In the present invention, the "computer-readable recording medium" is not limited to portable recording media such as a floppy disk or CD-ROM, and is understood to include as well internal memory devices inside the computer, such as various types of RAM and ROM, as well as fixed external memory devices of the computer, such as a hard disk.

The Program product may be realized as many aspects. For example:

(i) Computer readable medium, for example the flexible disks, the optical disk, or the semiconductor memories;

(ii) Data signals, which comprise a computer program and are embodied inside a carrier wave;

(iii) Computer including the computer readable medium, for example the magnetic disks or the semiconductor memories; and (iv) Computer temporally storing the computer program in the memory through the data transferring means.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A printing device for selecting a set of photographic image data for printing from among multiple sets of photographic image data, the device comprising:
    a data acquiring module which is configured to receive photographic image data that contains pixel color information, and thumbnail image data of the photographic image data, the thumbnail image data containing pixel color information;
    a thumbnail image analyzing module which is configured to select one or more specific pixels from among pixels of the thumbnail image data;
    a photographic image analyzing module which is configured to perform analysis of the photographic image data, for a specific region thereof constituting a part of an image of the photographic image data corresponding to the specific pixels of the thumbnail image data; and calculate a localized blur level which represents indistinctness of image in the specific region;
    a printing module which is configured to carry out printing based on the photographic image data, in case where the localized blur level of the specific region contained in the photographic image data meets a prescribed condition; and
    a processor, wherein
    the thumbnail image analyzing module determines whether a pixel under examination is one of the specific pixels based on data for the pixel under examination and data for a pixel neighboring the pixel under examination,
    the photographic image analyzing module determines the localized blur level based on data for a plurality of pixels contained in the specific region, the plurality of pixels being lined up in a direction towards a position of the neighboring pixel with respect to the pixel under examination in an image of the thumbnail image data, and
    each of the modules of the printing device is executed by the processor.

2. The device of claim 1 wherein
the thumbnail image analyzing module
    selects one or more first specific pixels from among pixels of the thumbnail image data by determining whether the pixel under examination is one of the first specific pixels based on the data for the pixel under examination and data for a first pixel neighboring a first side of the pixel under examination; and
    selects one or more second specific pixels from among the pixels of the thumbnail image data by determining whether the pixel under examination is one of the second specific pixels based on the data for the pixel under examination and data for a second pixel neighboring a second side of the pixel under examination,
a direction in which the pixel under examination and the second pixel line up forms a 90 degree angle with respect to a direction in which the pixel under examination and the first pixel line up,
the photographic image analyzing module
    determines a first localized blur level for a first specific region corresponding to the first specific pixels based on data for a plurality of pixels lining up in the direction in which the first pixel lies with respect to the pixel under examination; and
    determines a second localized blur level for a second specific region corresponding to the second specific pixel based on data for a plurality of pixels lining up in the direction in which the second pixel lies with respect to the pixel under examination, and
the printing module, in case where the first and second localized blur levels of the first and second specific regions meet a prescribed condition, performs printing based on the photographic image data.

3. The device of claim 1 wherein
the photographic image data contains a plurality of frequency component coefficients; and
the photographic image analyzing module,
    based on a plurality of frequency component coefficients representing change in level of brightness of the specific region for a direction in which the neighboring pixel lies with respect to the specific pixel in an image of the thumbnail image data, selects one basic pattern from among a plurality of basic patterns represented respectively by the plurality of frequency component coefficients, the basic patterns being associated with mutually different ranges of blur; and
    based on a range of blur associated with the selected basic pattern, determines the localized blur level of the specific region.

4. The device of claim 3 wherein
the thumbnail image analyzing module
    selects one or more first specific pixels from among pixels of the thumbnail image data by determining whether the pixel under examination is one of the first specific pixels based on the data for the pixel under examination and data for a first pixel neighboring a first side of the pixel under examination; and
    selects one or more second specific pixels from among the pixels of the thumbnail image data by determining whether the pixel under examination is one of the second specific pixels based on the data for the pixel under examination and data for a second pixel neighboring a second side of the pixel under examination,
a direction in which the pixel under examination and the second pixel line up forms a 90 degree angle with respect to a direction in which the pixel under examination and the first pixel line up,
the photographic image analyzing module, based on the coefficient representing change in level of brightness for the direction in which the first pixel lies with respect to the pixel under examination, selects one first basic pattern for a first specific region corresponding to the first specific pixel, and based on a range of blur associated with the first basic pattern, determines a first localized blur level of the first specific region; and based on the coefficient representing change in level of brightness for the direction in which the second pixel lies with respect to the pixel under examination, selects one second basic pattern for a second specific region corresponding to the second specific pixel, and based on a range of blur associated with the second basic pattern, determines a second localized blur level of the second specific region, and the printing module, in case where the first and second localized blur levels of the first and second specific regions meet a prescribed condition, performs printing based on the photographic image data.

5. The device of claim 1 wherein
the thumbnail image analyzing module designates the pixel under examination as one of the specific pixel, in case where a difference between a level of brightness of data of the pixel under examination and a level of brightness of data of the neighboring pixel exceeds a first threshold.

6. The device of claim 5 wherein
the first threshold is determined depending on an average value of levels of brightness of pixels of the thumbnail image data.

7. The device of claim 1 wherein
the thumbnail image analyzing module determines a facial region in which a human face appears within the image of the thumbnail image data, and selects the specific pixel from among pixels contained in the facial region.

8. The device of claim 1 wherein
the thumbnail image analyzing module includes a camera shake data generating module that,
based on a first disparity between the data of the pixel under examination and data of a first pixel neighboring a first side of the pixel under examination, as well as a second disparity between the data of the pixel under examination and data of a second pixel neighboring a second side of the pixel under examination, generates first camera shake data representing whether the photographic image data is a camera shake image; and
in case where the photographic image data is a camera shake image, generates second camera shake data representing a direction of camera shake.

9. The device of claim 1 wherein
the thumbnail image analyzing module determines a facial region in which a human face appears within the image of the photographic image data, and selects on one more pixels in the facial region as the specific pixels.

10. A method for determining whether an image of a photographic image data file is blurred, comprising:
preparing photographic image data that contains pixel color information, and thumbnail image data of the photographic image data, the thumbnail image data containing pixel color information;
selecting one or more specific pixels from among pixels of the thumbnail image data;
analyzing the photographic image data, for a specific region thereof constituting a part of an image of the photographic image data corresponding to the specific pixels of the thumbnail image data, and calculating a localized blur level which represents indistinctness of image in the specific region; and
determining the image of the photographic image data as blurred, in case where the localized blur level of the specific region contained in the photographic image data meets a prescribed condition, wherein
the selecting of one or more specific pixels includes determining whether a pixel under examination is one of the specific pixels based on data for the pixel under examination and data for a pixel neighboring the pixel under examination,
the analyzing of the photographic image data includes determining the localized blur level based on data for a plurality of pixels contained in the specific region, the plurality of pixels being lined up in a direction towards a position of the neighboring pixel with respect to the pixel under examination in an image of the thumbnail image data, and
each of the operations of the method for determining whether an image of a photographic image data file is blurred is executed by a processor.

11. A computer program product for determining whether an image of a photographic image data file is blurred, the computer program product comprising:
a non-transitory computer readable medium; and
a computer program stored on the non-transitory computer readable medium, the computer program comprising:
a portion for preparing photographic image data that contains pixel color information, and thumbnail image data of the photographic image data, the thumbnail image data containing pixel color information;
a portion for selecting one or more specific pixels from among pixels of the thumbnail image data;
a portion for analyzing the photographic image data, for a specific region thereof constituting a part of an image of the photographic image data corresponding to the specific pixels of the thumbnail image data, and calculating a localized blur level which represents indistinctness of image in the specific region; and
a portion for determining the image of the photographic image data as blurred, in case where the localized blur level of the specific region contained in the photographic image data meets a prescribed condition, wherein
the portion for selecting one or more specific pixels includes a portion for determining whether a pixel under examination is one of the specific pixels based on data for the pixel under examination and data for a pixel neighboring the pixel under examination, and
the portion for analyzing the photographic image data includes a portion for determining the localized blur level based on data for a plurality of pixels contained in the specific region, the plurality of pixels being lined up in a direction towards a position of the neighboring pixel with respect to the pixel under examination in an image of the thumbnail image data.

* * * * *